H. K. CRUIT.
FILTERS.
No. 180,848.        Patented Aug. 8, 1876.
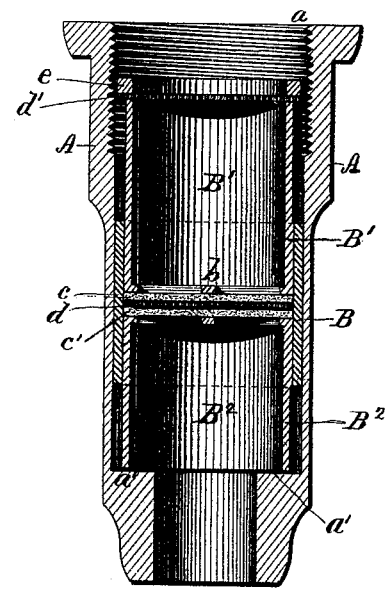
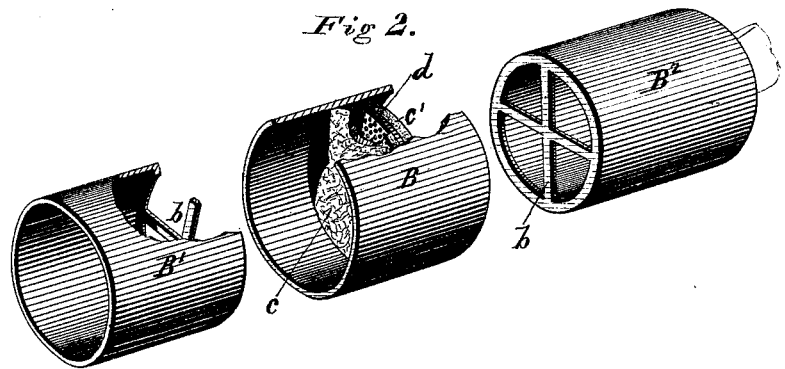
WITNESSES
Harry King
John G. Center
INVENTOR
Henry K. Cruit
A. M. Smith
By his Attorney

UNITED STATES PATENT OFFICE.

HENRY K. CRUIT, OF WASHINGTON, DISTRICT OF COLUMBIA.

IMPROVEMENT IN FILTERS.

Specification forming part of Letters Patent No. 180,848, dated August 8, 1876; application filed June 23, 1876.

*To all whom it may concern:*

Be it known that I, HENRY K. CRUIT, of the city and county of Washington, District of Columbia, have invented certain new and useful Improvements in Filters, of which the following is a full, clear, and exact description, reference being had to the accompanying drawings, making part of this specification, in which—

Figure 1 represents my improved filter in section; and Fig. 2 represents, in perspective, the inner reversible filtering chamber or cylinder, with its parts separated or detached, and broken away in part to show the arrangement.

My invention relates to a novel construction of reversible filter arranged within a supplemental and removable cock or spigot, and adapted to be readily and quickly applied to or removed from any ordinary spigot or hydrant; and it consists in the arrangement, within said removable supplemental spigot, of a reversible filtering-cylinder, composed of an outer central ring or band, inclosing the adjacent barred ends of two removable smaller rings or cylinders, which serve to clamp the filtering material and strainer between them within the larger central ring, as hereinafter explained.

In the accompanying drawings, A represents the supplemental spigot or body of the filter, made cylindrical in form, and provided at its larger or upper end with an internal screw-thread, $a$, adapting it to be readily applied to or removed from an ordinary hydrant or spigot. The bore or internal diameter of the cylinder A is made uniform from the mouth or screw-thread end down to near the lower end, where it is reduced to form the nozzle or discharge-outlet, forming a square shoulder at $a'$, upon which the reversible filtering-cylinder rests and is supported. This reversible filtering-cylinder is composed of three parts, as follows, viz: a central ring or cylinder, B, the external diameter of which conforms to and adapts it to slide within the case A, and two smaller end cylinders, $B^1$ $B^2$, fitting snugly within the larger ring B, as shown. The adjacent inner ends of the smaller cylinders are provided with strainer-bars $b$, and adjacent to these bars, within the cylinder B, are placed two layers, $c$ $c'$, of felt, canton-flannel, sponge, or other suitable filtering material, with a strainer-diaphragm, $d$, of wire-gauze, perforated sheet metal, or other suitable material, intermediate between said filtering layers $c$ $c'$. These layers of filtering material and the intermediate strainer are held snugly in place by the cross-barred ends of cylinders B B, and afford, whichever end of the filtering-cylinder is placed toward the mouth of case A, the same relation and arrangement of filtering and straining devices to the escaping water. Thus constructed, the filtering-cylinder is placed within the case A, resting on the shoulder $a'$, and upon its upper end is placed a second strainer-disk, $d'$, and over said disk a packing-ring, $e$, of leather or other suitable material, for making the joint tight between the case A and the spigot or hydrant to which said case or supplementary spigot and filter may be applied.

By the construction of the filter as described, it will be seen that all expensive fittings are, as far as practicable, avoided, but a single screw-thread being requisite, and that only when the spigot or hydrant to which it is to be applied has a screw-thread formed upon it; and where the screw-thread is not required, an enlarged chamber in lieu thereof, and a rubber ring arranged within said chamber, will serve to unite the filter to the hydrant or spigot with sufficient grasp to retain it in place.

Whenever the filter becomes foul or obstructed, all that is required for its thorough cleansing is to simply remove the case A, reverse the filtering-cylinder, replacing the strainer $d'$ and packing-ring $e$, when, by screwing the case A again upon the hydrant and turning on the water, the first flow of water is made to thoroughly wash out all the accumulations of the filter in its former position.

The means for securing the case or filter to the hydrant may, of course, be varied by the manufacturer to suit the different forms of spigot or hydrant in use.

Having now described my invention, what I claim as new, and desire to secure by Letters Patent, is—

1. The reversible filtering-cylinder B B¹ B², provided with the bars $b\ b$, in combination with the filters $c\ c$, intermediate strainer $d$, and inclosing-case A, constructed and arranged substantially as and for the purpose described.

2. The combination, with the case A, of the three-part cylinder B B¹ B², filters $c\ c'$, and strainers $d\ d'$, all arranged and operating as described.

HENRY K. CRUIT.

Witnesses:
 M. M. ROHRER,
 HARRY M. ROHRER.